United States Patent
Forssen et al.

(10) Patent No.: US 6,173,014 B1
(45) Date of Patent: *Jan. 9, 2001

(54) METHOD OF AND APPARATUS FOR INTERFERENCE REJECTION COMBINING AND DOWNLINK BEAMFORMING IN A CELLULAR RADIO COMMUNICATIONS SYSTEM

(75) Inventors: Ulf Forssen, Saltsjöboo; Thomas Östman, Spånga, both of (SE); Gregory E. Bottomley, Cary, NC (US)

(73) Assignee: Telefonaktiebolaget LM Ericsson, Stockholm (SE)

( * ) Notice: Under 35 U.S.C. 154(b), the term of this patent shall be extended for 0 days.

This patent is subject to a terminal disclaimer.

(21) Appl. No.: 08/655,930

(22) Filed: May 31, 1996

Related U.S. Application Data

(62) Division of application No. 08/284,775, filed on Aug. 2, 1994, now Pat. No. 5,680,419.

(51) Int. Cl.[7] .............................. H04B 7/02; H04B 7/10; H04L 1/02

(52) U.S. Cl. ..................... 375/267; 375/299; 375/347; 455/132

(58) Field of Search ................................... 375/262, 265, 375/341, 346, 347, 348, 349, 229, 230, 232, 235, 343, 315, 259, 299; 455/132, 133; 329/304; 342/361

(56) References Cited

U.S. PATENT DOCUMENTS

| 4,644,562 | 2/1987 | Kavehrad et al. | 375/235 |
|---|---|---|---|
| 4,713,817 | 12/1987 | Wei | 375/244 |

(List continued on next page.)

FOREIGN PATENT DOCUMENTS

| 0 425 458A1 | 5/1991 | (EP) . |
|---|---|---|
| 0 443 997 | 8/1991 | (EP) . |

(List continued on next page.)

OTHER PUBLICATIONS

J. H. Winters, "Signal Acquisition And Tracking With Adaptive Arrays In the Digital Mobile Radio System IS–54 With Flat Fading", IEEE Trans. Veh. Technol., vol. 42, pp 377–384, Nov. 1993.

A.P. Clark and S. Hariharan, "Adaptive Channel Estimator For An HF Radio Link", IEEE Trans. Commun., vol. 37, pp. 918–926, Sep. 1989.

G.D'Aria, R. Piermarini and V. Zingarelli, "Fast Adaptive Equalizers For Narrow–Band TDMA Mobile Radio", IEEE Trans. Veh. Technol., vol. 40, pp. 392–404, May 1991.

(List continued on next page.)

*Primary Examiner*—Tesfaldet Bocure
(74) *Attorney, Agent, or Firm*—Burns, Doane, Swecker & Mathis, L.L.P.

(57) ABSTRACT

Recently, interference rejection combining techniques have been proposed which can increase significantly the performance of the uplink in C/I limited environments. Another interesting property of the IRC techniques is that their C/I performance does not degrade as the correlation between the received signals increases. This feature of IRC techniques is exploited in the present invention to allow for a reduced spacing between the antennas. According to another aspect of the present invention, the performance of the downlink is improved using beamforming techniques to "steer" base station transmissions toward a desired mobile station. In this way, the performance of the downlink is improved using beamforming techniques to a degree similar to that at which the uplink has been improved using IRC techniques. This allows the system designer to more fully exploit the variations in system design associated with improving the uplink performance.

16 Claims, 7 Drawing Sheets

U.S. PATENT DOCUMENTS

| | | | |
|---|---|---|---|
| 4,992,798 | | 2/1991 | Nozue et al. ............................ 455/295 |
| 5,031,193 | | 7/1991 | Atkinson et al. ...................... 375/231 |
| 5,048,059 | | 9/1991 | Dent ....................................... 375/340 |
| 5,109,390 | * | 4/1992 | Gilhousen et al. .................... 375/200 |
| 5,155,744 | | 10/1992 | Ringelhaan ............................ 375/341 |
| 5,164,961 | | 11/1992 | Gudmundson ........................ 375/341 |
| 5,191,598 | | 3/1993 | Backstrom et al. ................... 375/347 |
| 5,319,677 | | 6/1994 | Kim ........................................ 375/347 |
| 5,351,274 | | 9/1994 | Chennakeshu et al. .............. 375/347 |
| 5,481,572 | | 1/1996 | Skold ..................................... 375/347 |
| 5,680,419 | * | 10/1997 | Bottomley ............................. 375/347 |
| 5,787,131 | * | 7/1998 | Bottomley ............................. 375/347 |
| 5,796,788 | * | 8/1998 | Bottomley ............................. 375/347 |
| 5,878,093 | * | 3/1999 | Molnar et al. ......................... 375/347 |
| 5,889,827 | * | 3/1999 | Bottomley et al. ................... 375/350 |
| 6,081,566 | * | 6/2000 | Molnar et al. ......................... 375/347 |

FOREIGN PATENT DOCUMENTS

| | | | |
|---|---|---|---|
| 54 3328A1 | | 11/1992 | (EP) ............................... H04B/7/00 |
| WO93/12590 | | 6/1993 | (WO) . |
| WO94/09568 | | 4/1994 | (WO) . |
| WO96/04738 | | 2/1996 | (WO) . |
| WO 06/04738 | * | 2/1996 | (WO) . |
| WO 98/53560 | * | 11/1998 | (WO) . |

OTHER PUBLICATIONS

Forney, "The Viterbi Algorithm", Proc. IEEE, vol. 61, pp. 286–296, Mar. 1973.

J. H. Winters, "Optimum Combining In Digital Mobile Radio With Cochannel Interference", IEEE J. Sel. Areas Commun., vol. SAC–2, pp. 528–539, Jul. 1984.

J. H. Winters, "Optimum Combining In Digital Mobile Radio With Cochannel Interference", Trans. Veh. Technol., vol. VT–33, pp. 144–155, Aug. 1984.

J. H. Winters, "On The Capacity Of Radio Communication Systems With Diversity In A Rayleigh Fading Environment", IEEE J. Sel. Areas Commun., vol. SAC–5, pp. 871–878, Jun. 1987.

J. H. Winters, "Optimum Combining For Indoor Radio Systems With Multiple Users", IEEE Trans. Commun., vol. COM–35, pp. 1222–1230, Nov. 1987.

P. Balaban and J. Salz, "Dual Diversity Combining And Equalization In Digital Cellular Mobile Radio", IEEE Trans. Veh. Technol., vol. 40, pp. 342–354, May 1991.

S.A. Hanna, M. El–Tanany, and S. A. Mahmoud, "An Adaptive Combiner For Co–Channel Interference Reduction In Multi–User Indoor Radio Systems", Proc. IEEE Veh. Technol. Conf., St. Louis, MO, May 19–22, 1991, pp. 222–227.

J. H. Winters, J. Salz, and R. D. Gitlin, "The Capacity Increase Of Wireless Communication Systems With Antenna Diversity", Proc. 1992 Conf. Inform. Sciences Syst., vol. II, Princeton, NJ, Mar. 18–20, 1992, pp. 853–858.

P. Balaban and J. Salz, "Optimum Diversity Combining And Equalization In Digital Data Transmission With Applications To Cellular Mobile Radio—Part I: Theoretical Considerations", IEEE Trans. Commun., vol. 40, pp. 885–894.

J. H. Winters, J. Salz, and R. D. Gitlin, "The Capacity Of Wireless Communication Systems Can Be Substantially Increased By The Use Of Antenna Diversity", 1st Intl. Conf. on Universal Personal Communications (ICUPC '92), Sep. 29–Oct. 2, 1992, Dallas, TX, pp. 02.01.1–02.01.5.

M. V. Clark, L. J. Greenstein, W. K. Kennedy, and M. Shafi, "Optimum Linear Diversity Receivers In Digital Cellular Radio", Proc. Third International Symposium On Personal, Indoor, and Mobile Radio Communications, Boston, MA, Oct. 19–21, 1992.

J. H. Winters, "Signal Acquisition And Tracking With Adaptive Arrays In Wireless Systems", Proc. 43rd IEEE Veh. Techol. Conf., Secaucus, NJ 1993, pp. 85–88.

J. H. Winters, J. Salz, and R. D. Gitlin, "The Impact Of Antenna Diversity On The Capacity Of Wireless Communication Systems", IEEE Trans. Commun., vol. 42, pp. 1740–1751, Feb./Mar./Apr. 1994.

D. W. Tufts and A. A. Shah, "Rapid Interference Suppression And Channel Identification For Digital, Multipath Wireless Channels", Proc. 44th IEEE Veh. Techol. Conf., Stockholm, Sweden, Jun. 7–10, 1994, pp. 1241–1245.

S. Simanapalli, "Adaptive Array Methods For Mobile Communications", Proc. 44th IEEE Veh. Technol. Conf., Stockholm, Sweden, Jun. 7–10, pp. 1503–1506.

W. H. Sheen and G. L. Stuber, "MLSE Equalization And Decoding For Multipath–Fading Channels", IEEE Trans. Commun. vol. 39, No. 10, Oct. 1991.

Q. Liu and Y. Wan, "An Adaptive Maximum–Likelihood Sequence Estimation Receiver With Dual Diversity Combining/Selection", Int. Symp. On Personal, Indoor And Mobile Radio Commun., Boston, MA, pp. 245–249, Oct. 19–21, 1992.

Q. Liu and Y. Wan, "A Unified MLSE Detection Technique For TDMA Digital Cellular Radio", 43rd IEEE Vehicular Technology Conference, Secaucus, NJ, pp. 265–268, May 18–20, 1993.

P. Monsen, "Theoretical And Measured Performance Of A DFE Modem On A Fading Multipath Channel", IEEE Trans. Commun., vol. COM–25, pp. 1144–1153, Oct. 1977.

P. Monsen, "Feedback Equalization For Fading Dispersive Channels", IEEE Trans. Info. Theory, vol. IT–17, pp. 56–64, Jan. 1981.

P. Monsen, "MMSE Equalization Of Interference On Fading Diversity Channels", IEEE Trans. Commun. vol. COM–32, No. 1, pp. 5–12, Jan. 1984.

G. Ungerboeck, "Adaptive Maximum–Likelihood Receiver For Carrier–Modulated Data–Transmission Systems", IEEE Trans. Commun., vol. COM–22, pp. 624–635, May 1974.

W. Van Etten, "Maximum Likelihood Receiver For Multiple Channel Transmission Systems", IEEE Trans. Commun., vol. COM–24, pp. 276–283, Feb. 1976.

"Free From Sample Timing And Input Level Controls", Secaucus, NJ, May 18–20, 1993, No. Conf. 43, May 18, 1993, Institute of Electrical and Electronics Engineers, pp. 408–411, XP 000393208, Kazuhiro Okanoue et al.

N. W. K. Lo, D. D. Falconer and A. U. H. Sheikh, "Adaptive Equalization And Diversity Combining For A Mobile Radio Channel", Proc. IEEE Globecom '90, pp. 507A.1.1–507A.2.5, Dec. 1990.

N. W. K. Lo, D. D. Falconer and A. U. H. Skeikh, "Adaptive Equalization And Diversity Combining For Mobile Radio Using Interpolated Channel Estimates", IEEE Trans. Veh. Technol., vol. 40, pp. 636–645, Aug. 1991.

R. D. Koilpillai, S. Chennakeshu, and R. L. Toy, "Equalizer Performance With Diversity For U.S. Digital Cellular", Intl. Symp. on Personal, Indoor and Mobile Radio Commun., Boston, MA, pp. 255–259, Oct. 19–21, 1992.

B. Picinbono, "On Circularity", IEEE Trans. Sig. Proc., vol. 42, pp. 3473–3482, Dec. 1994.

G. E. Bottomley and K. Jamal, "Adaptive Arrays And MLSE Equalization", Proc. VTC '95, Chicago, IL, Jul. 1995, pp. 50–54.

Young C. Yoon and Harry Leib, "Matched Filtering In Improper Complex Noise And Application To DS–CDMA", IEEE publication No. O–7803–3002–1/95, 1995, pp. 701–705.

W. Lee and Y. Yeu, "Polarization Diversity System For Mobile Radio", IEEE Transactions on Communications, COM–20(5), pp. 912–923, Oct. 1972.

S. Kozono, T. Tsuruhara, and M. Sakamotot, "Base Station Polarization Diversity Reception For Mobile Radio", IEEE Transactions on Vehicular Technology, 33(4), pp. 301–306, 1978.

A. Baier, G. Heinrich, and U. Wellens, "Bit Synchronization And Timing Sensitivity In Adaptive Viterbi Equalizers For Narrowband–TDMA Digital Mobile Radio Systems", Proc. VTC '88, Philadelphia, PA, pp. 377–384, 1988.

M. V. Clark, L. J. Greenstein, W. K. Kennedy, and M. Shafi, "Optimum Linear Diversity Receivers For Mobile Communications", IEEE Trans. Veh. Technol., vol. 43, pp. 47–56, Feb. 1994.

J. Salz and J. H. Winters, "Effect Of Fading Correlation On Adaptive Arrays In Digital Mobile Radio", IEEE Trans. Veh. Technol., vol. 43, pp. 1049–1057, Nov. 1994.

J. W. Modestino and V. M. Eyuboglu, "Integrated Multielement Receiver Structures For Spatially Distributed Interference Channels", IEEE Trans. On Info. Theory, vol. IT–32, pp. 195–219, Mar. 1986.

* cited by examiner

METHOD OF AND APPARATUS FOR INTERFERENCE REJECTION COMBINING AND DOWNLINK BEAMFORMING IN A CELLULAR RADIO COMMUNICATIONS SYSTEM

RELATED APPLICATIONS

This application is a continuation-in-part of U.S. patent application Ser. No. 08/284,775 entitled METHOD OF AND APPARATUS FOR INTERFERENCE REJECTION COMBINING IN MULTI-ANTENNA DIGITAL CELLULAR COMMUNICATION SYSTEMS to Gregory E. Bottomley, filed Aug. 2, 1994 now U.S. Pat. No. 5,680,419. The disclosure of the parent patent application is expressly incorporated here by reference.

BACKGROUND

The present invention relates to cellular radio communications in general, and more specifically, to a method of, and apparatus for, reducing the spacing between receive antennas in a signal combining base station and using adaptive beamforming to improve the downlink performance.

In a digital cellular radio communication system, radio signals which are digitally modulated are used to convey information between radio base stations and mobile stations. The radio base stations transmit downlink signals to the mobile stations and receive uplink signals transmitted by the mobile stations. A common problem that occurs in digital cellular radio communication systems is the loss of information in the uplink and downlink signals as a result of multipath fading and interference which may exist in the radio transmission channel.

With regard to the former, multipath fading, there are basically two multipath effects: fading and time dispersion. When the path length between a mobile station and a base station is relatively short, fading arises from the interaction of the transmitted signal, or main ray, and reflections thereof, or echoes, which arrive at the receiver at approximately the same time. When this occurs, the main ray and echoes add either destructively or constructively. If there are a large number of echoes, the pattern of destructive and constructive addition takes on a Rayleigh distribution, which is why this effect is sometimes called "Rayleigh fading". Certain points in the fading pattern, where destructive addition results in fading "dips", result in a relatively low carrier-to-noise (C/N) characteristic of the received signal.

The effects of fading dips can be mitigated by having multiple receive antennas and employing some form of diversity combining, such as selective combining, equal gain combining, or maximal ratio combining, wherein signals from each receive antenna are combined to create a single received signal. Diversity techniques take advantage of the fact that the fading on the different antennas is not the same, so that when one antenna receives a fading dip, chances are the other antenna does not. Note Mobile Communications Design Fundamentals by William C. Y. Lee, Howard W. Sams & Co., Indiana, USA. In section 3.5.1 of this book, several examples are given describing how signals from two receiver amplifiers with separate antennas can be combined to counteract fading.

For longer path lengths, time dispersion occurs when the echoes are delayed with respect to the main ray. If an echo of sufficient magnitude arrives at the receiver delayed from the main ray by an amount of time on the order of the symbol period, time dispersion gives rise to intersymbol interference (ISI). Time dispersion may be advantageously corrected by using an equalizer. In the case of digital signal modulation, a maximum likelihood sequence estimation (MLSE) equalizer such as described in Digital Communications, $2^{nd}$ Ed., by John G. Proakis, Mc-Graw Hill Book Company, New York, New York, USA, 1989 may be used. In section 6.7 of this book, various methods are described for detecting signals corrupted by time dispersion, or inter-symbol interference (ISI), using MLSE equalization.

There may also exist signal sources in the radio environment which are not orthogonal to the desired signal. Non-orthogonal signals, or interference, often come from radios operating on the same frequency (i.e., co-channel interference) or from radios operating on neighboring frequency bands (i.e., adjacent-channel interference). When the carrier-to-interference ratio (C/I) of a channel is too low, the quality of voice output at the mobile station is poor. Many techniques have been developed in order to minimize interference to tolerable levels including frequency re-use patterns and adaptive beamforming which can be used to steer a null in an antenna pattern in the direction of an interferer.

More recently, methods have been proposed that partially solve the problems of multipath fading and interference. In U.S. Pat. No. 5,191,598 to Bäckström, et al., for example, the problem of accurately detecting signals in the presence of fading and time dispersion is overcome by using a Viterbi-algorithm having a transmission function estimated for each antenna. By reference thereto, U.S. Pat. No. 5,191,598 is incorporated herein in its entirety. Another method of accurately detecting signals in the presence of fading and interference was presented in the IEEE Transactions on Vehicular Technology, Vol. 42, No. 4, Nov. 1993, J. H. Winters: "Signal Acquisition and Tracking with Adaptive Arrays in the Digital Mobile Radio System IS-54 with Flat Fading".

Although the above described conventional techniques can be used to improve signal quality, there remains room for improvement. Thus, in the parent application, interference rejection combining (IRC) techniques are described which combat interference, for example, using impairment correlations to improve the maximum likelihood sequence estimation.

However, the parent application describes techniques which can be used to improve the reception of signals. If used, for example, in a radio base station, these techniques will render the system unbalanced, i.e., the uplink will have superior quality to the downlink. If the system is unbalanced, then the system design will be predicated on the weakest link, i.e., the downlink, and cannot take full advantage of the increased quality provided by the IRC techniques used in the uplink. For example, if a system designer wanted to tradeoff improved quality for capacity by decreasing the frequency reuse, he or she would be hampered by the fact that the downlink quality was unimproved.

SUMMARY

According to one aspect of the present invention, Applicants have recognized that although IRC techniques provide a performance improvement on the uplink, similar improvements cannot be achieved for the downlink wherein mobile units typically include only a single antenna. Having unbalanced performances between the uplink and downlink is, however, undesirable because it does not allow a system designer to fully exploit the advantages associated with improved performance, e.g., increased frequency re-use. Thus, according to one exemplary embodiment of the present invention, Applicants have increased the performance of the downlink using beamforming techniques to "steer" base station transmissions toward a desired mobile station. In this way, the performance of the downlink is improved using beamforming techniques to a degree similar to that at which the uplink has been improved using IRC techniques. This allows the system designer to more fully exploit the variations in system design associated with improving the uplink performance.

According to another aspect of the invention, a base station including an IRC receiver can be provided with an antenna system including two or more antennas which are spaced closely together. For example, whereas a conventional diversity base station might have a pair of antennas which are spaced 10–20 wavelengths apart, a base station according to the present invention can have much less spacing between receive antennas, e.g., on the order of one wavelength or less. This produces a more compact and aesthetically pleasing base station, as well as permits the base station receiver to provide direction of arrival information to the base station transmitter, which information is used in the afore-described beamforming techniques.

BRIEF DESCRIPTION OF THE DRAWINGS

Exemplary embodiments of the present invention will now be described in more detail with reference to the accompanying drawings, in which like descriptive labels are used to refer to similar elements.

DETAILED DESCRIPTION

In the following description, for purposes of explanation and not limitation, specific details are set forth, such as particular circuits, circuit components, techniques, etc. in order to provide a thorough understanding of the present invention. However, it will be apparent to one skilled in the art that the present invention may be practiced in other embodiments that depart from these specific details. In other instances, detailed descriptions of well-known methods, devices, and circuits are omitted so as not to obscure the description of the present invention with unnecessary detail.

Figure 1:
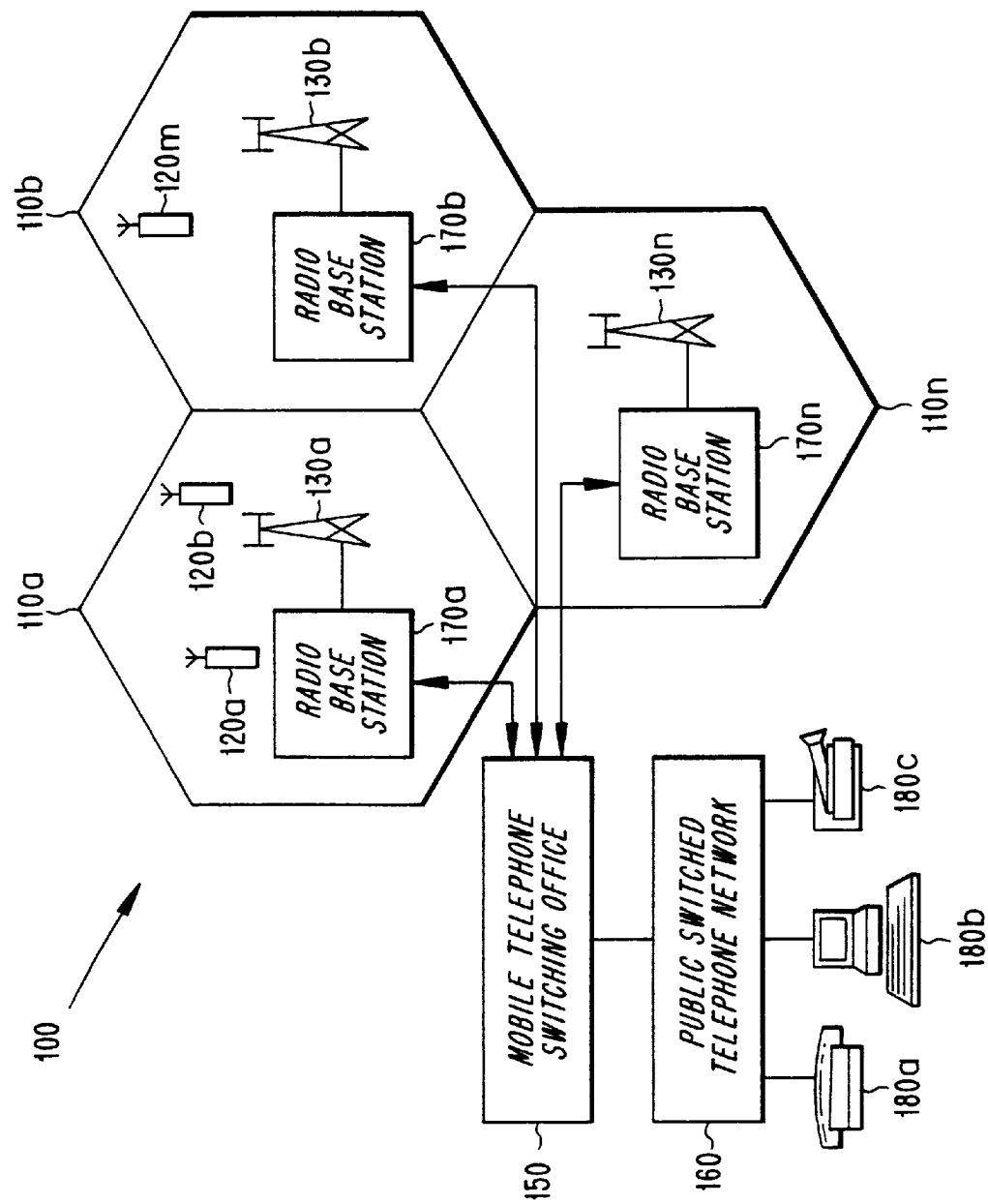
FIG. 1 illustrates an exemplary cellular radio communication system.

An exemplary cellular radio communication system 100 is generally illustrated in FIG. 1. A geographic region served by the system 100 may be subdivided into a number, n, of smaller regions of radio coverage known as cells 110a–n, each cell 110a–n having associated with it a respective radio base station 170a–n. Each radio base station 170a–n has associated with it an antenna system 130a–n where inter alia the transmit and receive antennas are located. The use of hexagonally-shaped cells 110a–n is a graphically convenient way of illustrating areas of radio coverage associated with base stations 170a–n respectively. In actuality, cells 110a–n may be irregularly shaped, overlapping, and not necessarily contiguous. Sectorization within cells 110a–n is also possible and contemplated by the present invention.

Distributed within cells 110a–n are a plurality of mobile stations 120a–m. Base stations 170a–n provide two-way radio communication with mobile stations 120a–m located within corresponding cells 110a–n respectively. Generally, the number, m, of mobile stations is vastly greater than the number, n, of radio base stations. Radio base stations 170a–n are coupled to the mobile telephone switching office (MTSO) 150 which provides inter alia a connection to the public switched telephone network (PSTN) 160 and henceforth to communication devices 180a–c. This basic cellular radiocommunication concept is known in the art and will not be further described here.

Figure 2:
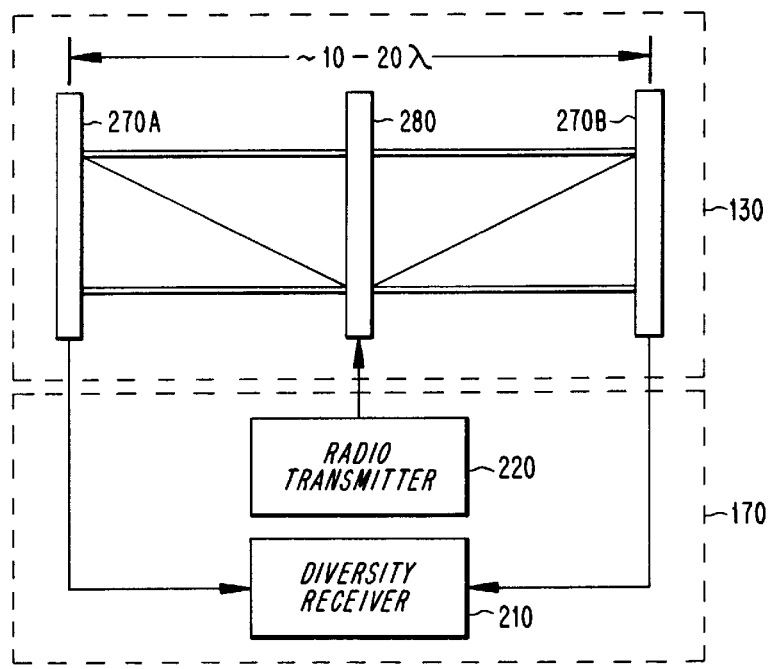
FIG. 2 illustrates a conventional base station and diversity antenna spacing.

A conventional base station antenna system 130 is illustrated in FIG. 2. The two receive antennas 270A and 270B are separated by 10–20 wavelengths in order to receive signals with uncorrelated fading patterns. The spacing required to receive uplink signals having uncorrelated fading varies from site to site but a typical rule of thumb is to use a 10–20 wavelength horizontal separation between receive antennas in medium size macro cells of 3–5 km in radius. For example, at 900 MHz the resulting separation is between 3 and 6 meters which results in a large and ugly antenna installation and which may cause problems with site acquisition and installation, especially in urban cells. A separate transmit antenna 280 can be mounted between the two receive antennas. The antennas may be formed as dipole antennas, microstrip patch arrays, or any suitable radiating structure.

Figure 3:
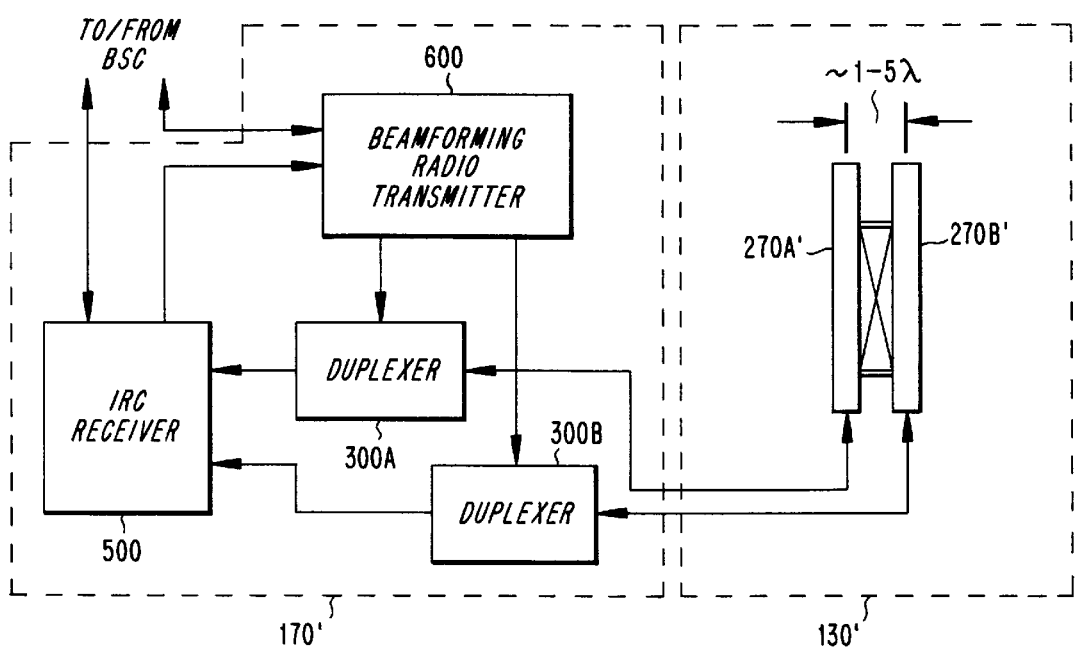
FIG. 3 depicts an exemplary base station according to the present invention.

An improved antenna system 130' according to a first exemplary embodiment of the present invention is illustrated in FIG. 3. There, the two receive antennas 270A' and 270B' are spaced relatively close together. This is possible due to the usage of IRC receiver 500. As mentioned above, the conventional system of FIG. 2 relies upon antennas that are spaced sufficiently far apart to provide signals having uncorrelated fading, which signals can be combined to provide a composite signal having an improved C/N characteristic (e.g., on the order of 3.5–5.5 dB better than the signal received at a fading dip). By way of contrast, IRC techniques rely upon the fact that, at specific points in time, the impairment (interference+noise) between signals from the same source (e.g., mobile station) received on two relatively closely spaced antennas will be correlated. Estimates of the impairment correlation are used to improve detected symbol hypotheses, which in turn counteracts the detrimental effects of interference. By removing the interference in this manner, the effect of fading dips is not as significant, particularly in systems which are interference limited.

Accordingly, although the spacing between receive antennas used in conjunction with an IRC receiver could be 10–20 wavelengths or more, smaller antenna spacings can be used since the property relied upon in the IRC receiver, i.e., the correlation of impairment, holds for smaller spacings. For example, according to the present invention, the antennas 270A' and 270B' can be spaced less than 10 wavelengths apart and, preferably, less than 5 wavelengths apart, e.g., 1–5 wavelengths. It is also anticipated that even less separation between receive antennas could be used, e.g., 0.5 wavelengths, which will be useful in exemplary embodiments described below wherein direction of arrival information is obtained to provide downlink beam steering. The antennas can, for example, be implemented as a two-column antenna array using duplex filters. Each column can be vertically polarized and have a 65–75 degree element pattern, e.g., of 10–20 elements. The antenna width can, for example, be approximately 30 cm at 1500 MHz.

A simplified improved base station 170' is illustrated in FIG. 3 where, for clarity, only a single transmitter 600 and receiver 500 is illustrated, although a base station will typically have a plurality of such transceivers. Base station 170' comprises inter alia duplexers 300A–B which are coupled to antennas 270A' and 270B' respectively. Uplink signals received by receive antennas 270A' and 270B' are coupled via duplexers 300A–B respectively to interference rejection combining (IRC) receiver 500 where the received uplink signals are combined as described by the ensuing text and figures. On the transmit side, downlink signals from beamforming transmitter 600 are coupled through duplexers 300A–B to antennas 270A' and 270B'.

Figure 4:
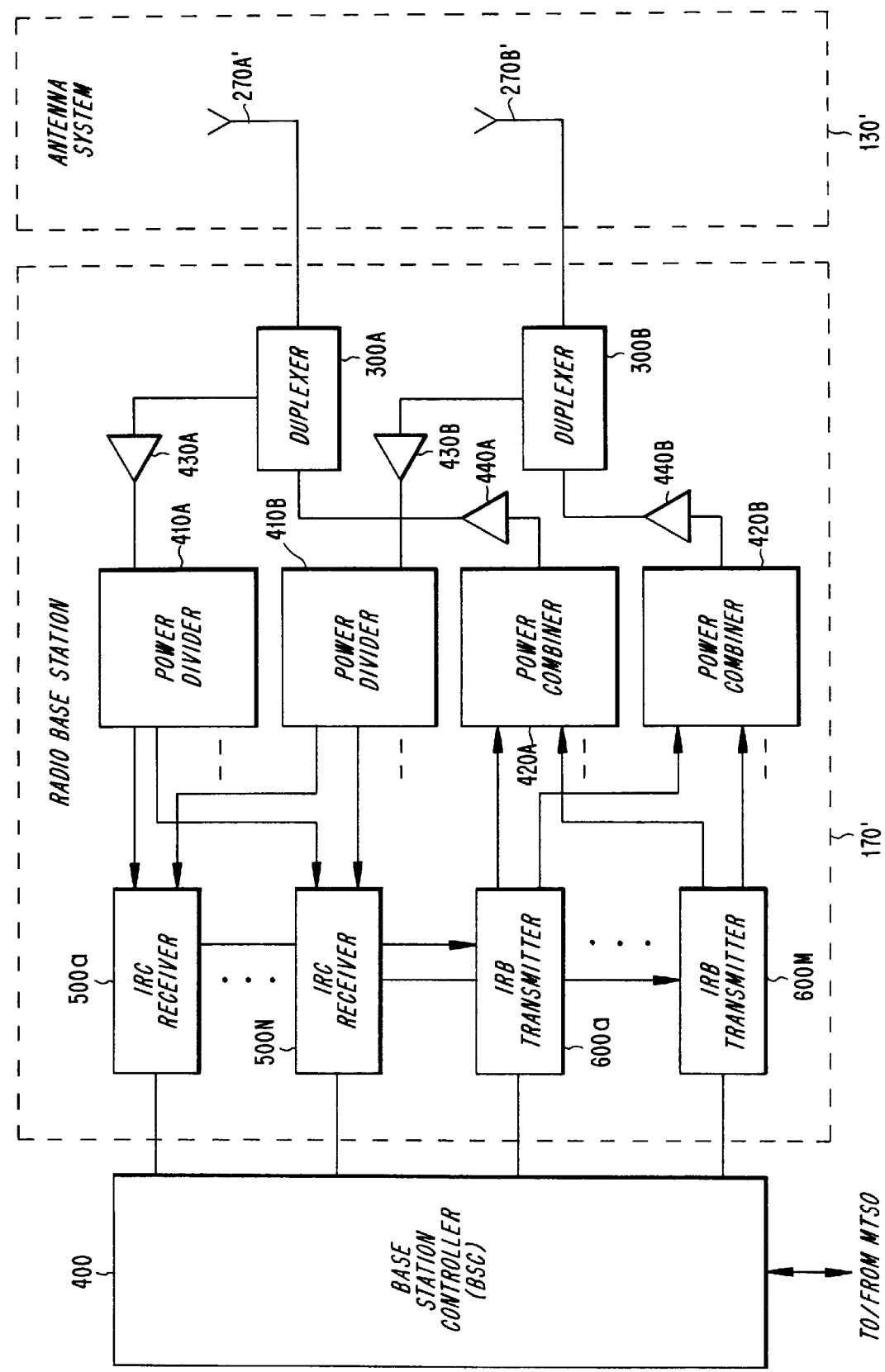
FIG. 4 shows the exemplary base station of FIG. 3 at a different level of detail.

FIG. 4 schematically illustrates the block diagram of improved radio base station 170' having a plurality of receivers and transmitters, improved antenna system 130', and base station controller (BSC) 400. While BSC 400 may be co-located with radio base station 170', antenna system 130' is generally located at some distance away from radio base station 170' and BSC 400. According to a first embodiment of the present invention antenna system 130' comprises at least two antennas 270A' and 270B' which may be used in duplex for both the reception of uplink signals from mobile stations and the transmission of downlink signals to mobile stations.

A mobile station located within a cell transmits uplink information to a base station using radio signals digitally modulated with the uplink information. As illustrated in FIG. 4, uplink radio signals received by antennas 270A' and 270B' are coupled to duplexers 300A–B respectively and subsequently to low-noise amplifiers 430A–B respectively where the received uplink radio signals are amplified sufficiently to overcome the noise introduced by the base station's receiver circuitry. The amplified received radio signals may then be coupled to power dividers 410A–B respectively where the amplified received radio signals are divided into a plurality of output received signals. If only a single radio channel is required, the power dividers 410A–B are not required. The output received signals are coupled to interference rejection combining (IRC) receivers 500a–N where there is, for example, one receiver for each radio channel assigned to a base station 170'. The number N represents the number of radio channels assigned to cell, or sector. Although shown as separate devices, receivers 500a–N may be fabricated as one assembly. Each IRC receiver 500a–N receives signals which originate from each antenna 270A' and 270B'. The output of each IRC receiver 500a–N is a bitstream of estimated uplink information which represents the uplink information originally transmitted by the mobile station. The estimated uplink information is coupled to base station controller 400 which controls the operation of base station 170' and provides the interface to MTSO 150.

In order to transmit downlink information from a base station to a mobile station, downlink information signals received from MTSO 150 are coupled to BSC 400 which directs the downlink information signal to one of a plurality of interference rejection beamforming (IRB) radio transmitters 600a–M according to a second embodiment of the present invention. Although the number N of diversity receivers and the number M of transmitters may be equal, it is not required. Each IRB transmitter 600a–M receives direction of arrival (DOA) information from a corresponding IRC receiver 500a–N as will be described in the ensuing text and figures. The DOA information is used in the IRB transmitter to generate phase and amplitude relationships between a plurality of output signals which are subsequently applied to antennas 270A' and 270B' to steer the resulting radiated beam to improve the downlink carrier-to-interference ratio received at a particular mobile station. As shown in FIG. 4, each IRB transmitter 600a–M digitally modulates a radio signal with the downlink information signals to produce two corresponding output downlink radio signals. The downlink radio signals from radio transmitters 600a–M are coupled to power combiners 420A–B, amplified in power amplifier 440A–B, coupled via duplexers 300A–B to antennas 270A' and 270B' and radiated as a downlink signal.

Figure 5:
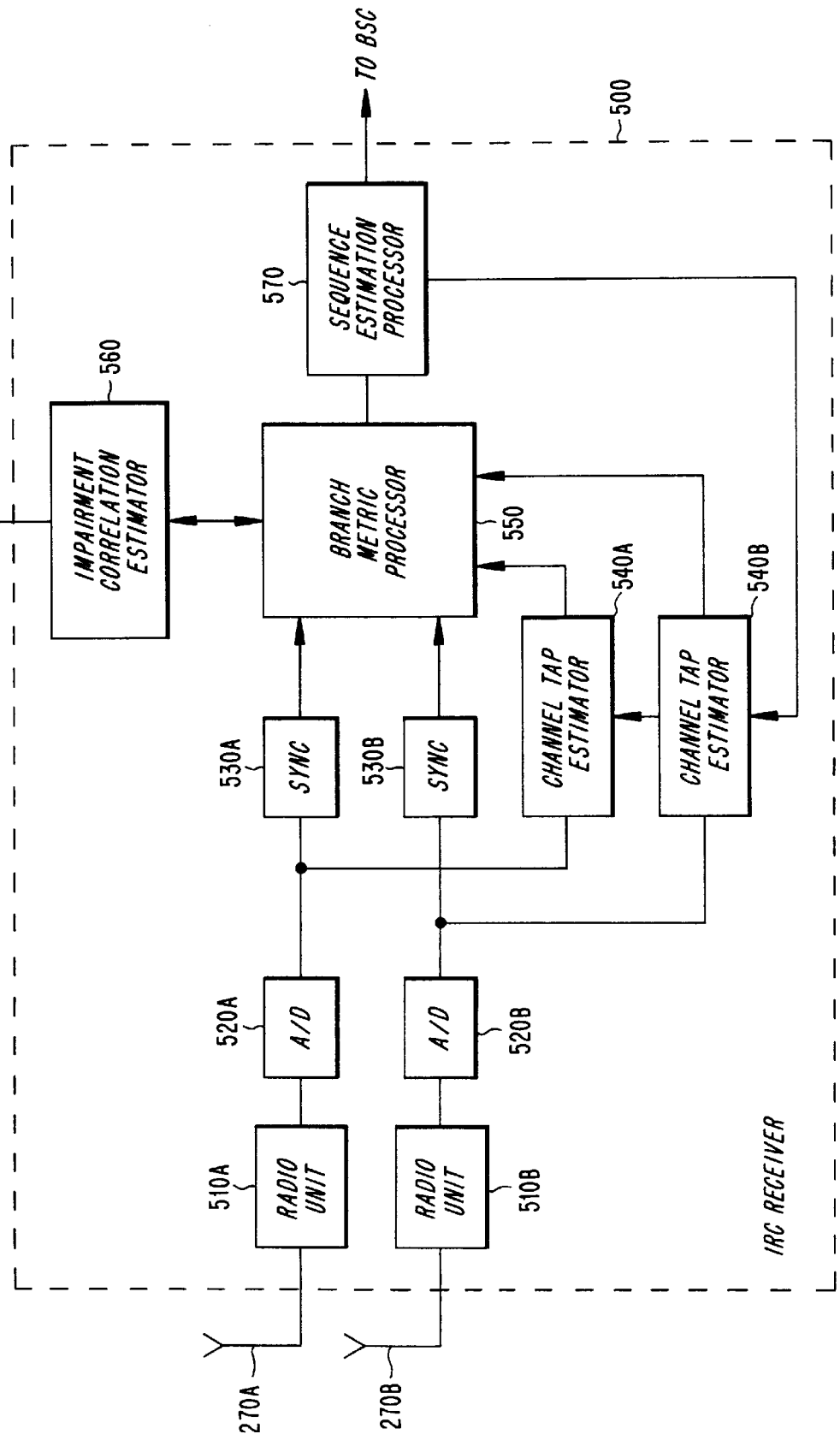
FIG. 5 is a block diagram of an IRC receiver according to an exemplary embodiment of the present invention.

In FIG. 5, IRC receiver 500 is illustrated in greater detail. For the sake of clarity and simplicity, FIG. 5 illustrates only a single receive channel; thus the duplexers 310A–B, amplifiers 430A–B, and power dividers 410A–B which are shown located between antennas 270A' and 270B' and IRC receivers 500a–N in FIG. 4 are not shown in FIG. 5. Note that IRC receivers 500a–N shown in FIG. 4 are functionally equivalent to IRC receiver 500 shown in FIG. 5; the subscript a-N refers to different radio channels.

Referring now to FIG. 5, a schematic block diagram of the interference rejection combining diversity receiver 500 is illustrated. The received radio signal on antenna 270A' comprises the signal originally transmitted by the mobile station as corrupted by the channel effects between antenna 270A' and the mobile station and also impairment received at antenna 270A'. Similarly, the received radio signal on antenna 270B' comprises the signal originally transmitted by the mobile station as corrupted by the channel effects between antenna 270B' and the mobile station and also impairment received at antenna 270B'.

Uplink radio signals received from antennas 270A' and 270B' respectively (after optional amplification and power division shown in FIG. 4) are coupled to radio units 510A–B respectively. Radio units 510A–B filter and downconvert the received radio signals according to known methods. The downconverted received radio signals are then coupled to analog to digital (A/D) converters 520A–B respectively where the downconverted radio signals are sampled and converted to received signal sample streams. The received signal sample streams are coupled to a signal pre-processor, or sync, blocks 530A–B respectively where the received signal sample streams are correlated with known timing/synchronization sequences embedded in the received radio signals according to known techniques.

The received signal sample streams are also coupled to channel tap estimators 540A–B to produce channel tap estimates which are used to model the radio transmission channel associated with each antenna 270A' and 270B'. Initial channel tap estimates can be obtained from sync correlation values or least-squares estimation according to known techniques. Subsequently, known channel tracking techniques can be used to update the channel estimates, e.g., using received data and tentative symbol estimate values generated in the sequence estimation processor 570. The channel tap estimates are input to the branch metric processor 550. The branch metric processor 550 forms branch metrics which are used by sequence estimation processor 570 to develop tentative and final estimates of the transmitted information symbol sequences. Specifically, hypothesized symbol values are filtered by channel tap estimates from blocks 540A and 540B to produce hypothesized received samples for each antenna. The differences between the hypothesized received information and the actual received information from blocks 530A and 530B, referred to as the hypothesis errors, give an indication of how good a particular hypothesis is. The squared magnitude of the hypothesis error is used as a metric to evaluate a particular hypothesis. The metric is accumulated for different hypotheses for use in determining which hypotheses are better using the sequence estimation algorithm, for example, the Viterbi algorithm.

Also coupled to the branch metric processor 550 is an estimate of the impairment correlation properties obtained from impairment correlation estimator 560. The estimate of the impairment correlation properties comprises information regarding the instantaneous impairment correlation properties between the antennas 270A' and 270B'. The impairment correlation estimator uses impairment process estimates to update and track the estimate of the impairment correlation properties. As distinguished from conventional techniques, branch metrics formed by processor 550 are improved by taking into account the correlation between the impairment associated with the signals received by the two antennas. This improved branch metric formulation is summarized below and described in more detail in the parent application.

IRC techniques expand conventional diversity combining techniques to exploit the above-described correlation, whereby significant gains in the quality of the received signal are realized. The branch metrics $M_h(n)$ formed according to IRC techniques can be described by the following equation.

$$M_h(n)=[r(n)-C(n)s_h(n)]^H A(n)[r(n)-C(n)sh(n)]=e_h^H(n)A(n)e_h(n)$$

where:

n is a time index;

$r(n)=[r_a(n), r_b(n)]$, are the signal samples received on each antenna;

$C(n)=$ $$\begin{bmatrix} C_a(0)...C_a(n) \\ C_b(0)...C_b(n) \end{bmatrix}$$

are the channel tap estimates of the form $C_x(\tau)$ where $\tau$ is the delay, i.e., $\tau=0$ is the main ray, T=1 is the first echo, etc.;

$S_h(n)=[s_h(n), s_h(n-1) \ldots ]^T$, are the hypothesized signal samples;

$z(n)=[z_a(n), z_b(n)]^T$, are the signal impairments received on each antenna;

$A(n)=R_{zz}(n)^{-1}$, or a related quantity, where $R_{zz}$ is the impairment correlation matrix which equals the expected value $E(z(n)z^H(n))$;

$e_h(n)=r(n)-C(n)s_h(n)$, is an estimate of the impairment for a given hypothesis.

The A(n) matrix (i.e., the A-matrix) is the inverse of the $R_{zz}(n)$ matrix, or a related quantity such as the adjoint or pseudo-inverse. As will be apparent to a person skilled in the art reading this application, $R_{zz}(n)$ and $A(n)$ are specific examples of impairment correlation properties of which other forms are known. Throughout the following, the term A-matrix is used generically to refer to any estimate of the impairment correlation properties.

Determination of the A-matrix for use in the present invention can be performed in a number of ways depending upon the specific application and the required performance. The simplest approach is to use a fixed set of values for the A-matrix, stored in memory, that are never updated. These values depend primarily on the configuration of the receive antennas and on the carrier frequencies being employed. An alternative approach is to determine the A-matrix from synchronization information and to keep the A-matrix values constant between synchronization fields, or other known fields. At each new occurrence of the synchronization field, the A-matrix can be recomputed, with or without use of the previous A-matrix values. Another alternative approach is to use synchronization fields to initialize, or improve, the A-matrix values and then to use decisions made on the data field symbols to track the A-matrix values.

Also, consideration is given for the method used to track the A-matrix values. Since the A-matrix comprises information regarding the impairment correlation properties between the antennas 270A' and 270B', standard estimation methods for estimating correlation or inverse correlation matrices can be applied. Using either known or detected symbol values, impairment values can be obtained by taking the differences between the received signal sample streams and the hypothesized received signal sample streams. At time n, this gives a vector of impairment values, denoted z(n); one value for each antenna. A straightforward way of forming the A-matrix is given by:

$$R_{zz}(n)=\lambda R_{zz}(n-1)+Kz(n)z^H(n)$$

$$A(n)=R_{zz}^{-1}(n)$$

K is a scaling constant, typically 1 or $\sqrt{(1-\lambda)}$. Because $R_{zz}(n)$ is a Hermitian matrix, only a portion of the matrix elements need be computed.

Such a straightforward approach is fairly high in complexity. One way to reduce complexity is to apply the matrix inversion lemma and update the A-matrix directly as:

$$A(n) = \frac{1}{\lambda}\left[A(n-1) - \left(\frac{1}{\lambda + (z(n))^H p(n)}\right)p(n)p^H(n)\right]$$

where:

$$p(n)=A(n-1)z(n)$$

Because the A-matrix is Hermitian, it is only necessary to compute those elements on the diagonal and either those elements above or below the diagonal.

These techniques for estimating and tracking the A-matrix are given only for purposes of illustration. In general, the A-matrix can be expressed and estimated in a variety of ways, as will be appreciated by a person skilled in the art who is reading this application. The present invention may also be applied to the blind equalization problem in which known synchronization sequences are absent. In this case, the A-matrix is estimated in a manner similar to how the channel is estimated.

As can be seen from the foregoing, the correlation between the signal impairment received on antenna 270A' and the signal impairment received on antenna 270B' is monitored and used to improve the processing of information bearing signals received on those antennas. This usage of the impairment correlation compensates for the effects of interference. Thus, the antennas 270A' and 270B' need not be spaced far enough apart to produce received signals having uncorrelated fading since the desired signal will typically be recognized even during fading dips due to the reduction in interference. This allows embodiments of the present invention to reduce spacing between receive antennas to an amount hitherto impossible using conventional, spatial diversity techniques.

Downlink Beamforming

The IRC algorithms can thus improve the base station receiver performance. The downlink, is, however, not improved and the performance of the system will thus be unbalanced with the uplink much better than the downlink. A second exemplary embodiment of the present invention presents a way to combine the IRC techniques previously described herein with direction of arrival (DOA) estimation and downlink beamforming so that an improvement to the downlink may be effected.

As mentioned above, conventional spatial diversity required receive antenna spacing on the order of 10–20 wavelengths. Since the antennas were spaced greater than 1 wavelength apart, the different lobes in the antennas' response pattern (i.e., the uncorrelated fading) prevented the base station from determining the DOA of a mobile station's signal from the received signal. However, since the spacing between receive antennas 270A' and 270B' according to the present invention can be made relatively small, e.g., between 0.5 and 1 wavelength, direction of arrival (DOA) information may be extracted from the received signal as described below.

Figure 6:
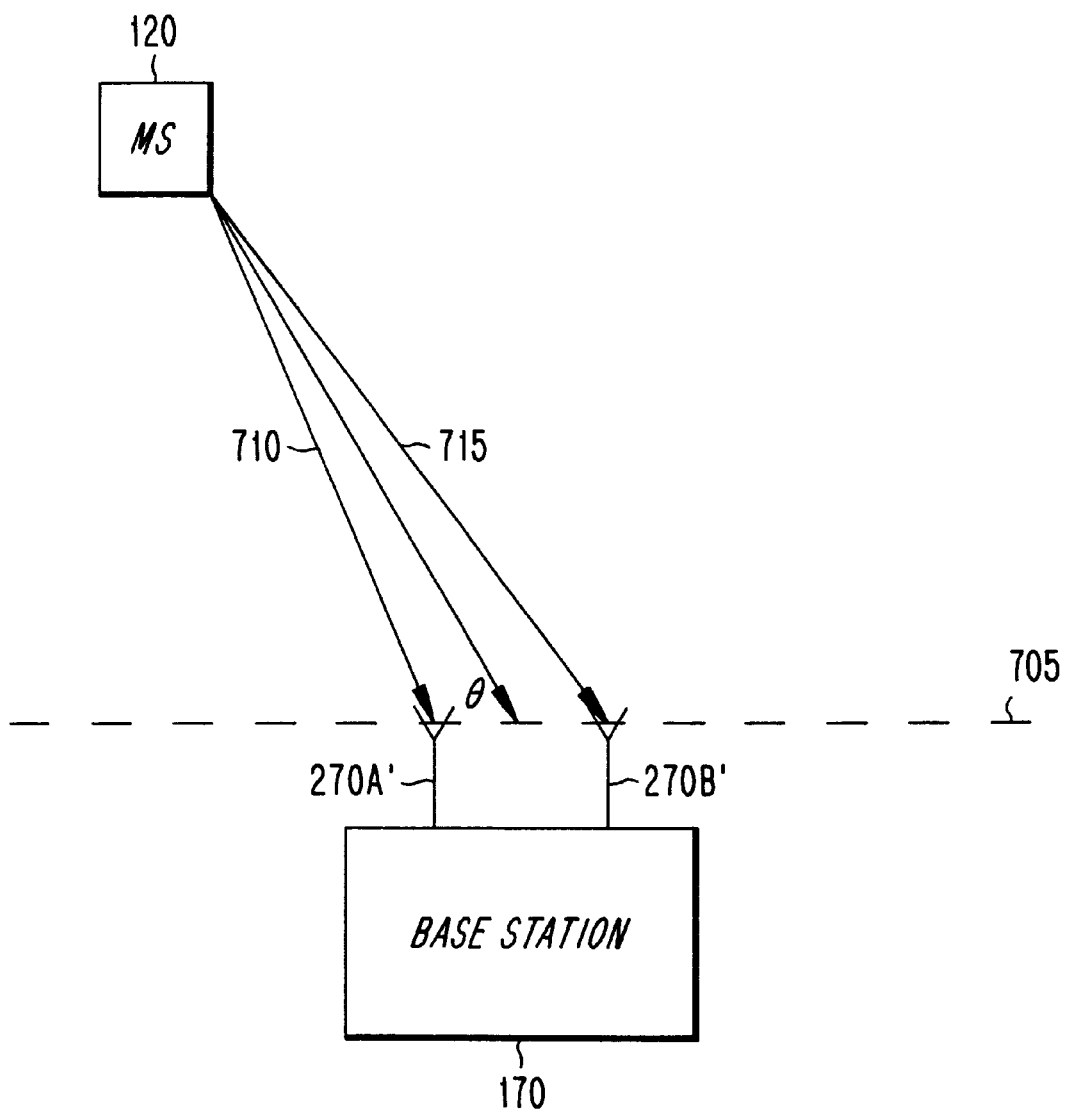
FIG. 6 illustrates the angle of incidence θ determined by IRC receivers according to exemplary embodiments of the present invention.

Referring to FIG. 6, suppose that 0 is the angle of incidence of a mobile station 120's signal (relative to a reference plane 705) whose DOA information is desired with respect to receiving base station 170. Since the propagation times of signal rays 710 and 715 will vary as a function of the angle θ, the angle θ can be determined using the phase shift between the signals received on antennas 270A' and 270B' and the covariance matrix of the received signal. The probability that the useful signal arrived from a particular angle, P(θ), can be computed as:

$$P(\theta) = [a(\theta)]^H R_{xx} a(\theta)$$

where:

a(θ) is the matrix containing each antenna's response to the received signal;

$R_{xx}$ is the covariance matrix of the useful signal defined as $R_{xx} = R_{rr} - R_{zz}$ where:

$R_{rr}$ is a running average of the received signal which can be computed as $R_{rr} = E\{r(n)[r(n)]H\}$; and Rzz is the impairment correlation matrix as defined above.

The angle of incidence associated with a particular mobile station's received signal is then chosen as the argument θ which maximizes the function P(θ). To smooth out instantaneous time variances, e.g., caused by fading dips, the direction of arrival θ can be averaged over a number of uplink bursts (e.g., 5–10 or 10–20 bursts) in order to determine average ($\theta_{avg}$) DOA information (the median could also be used).

Figure 7:
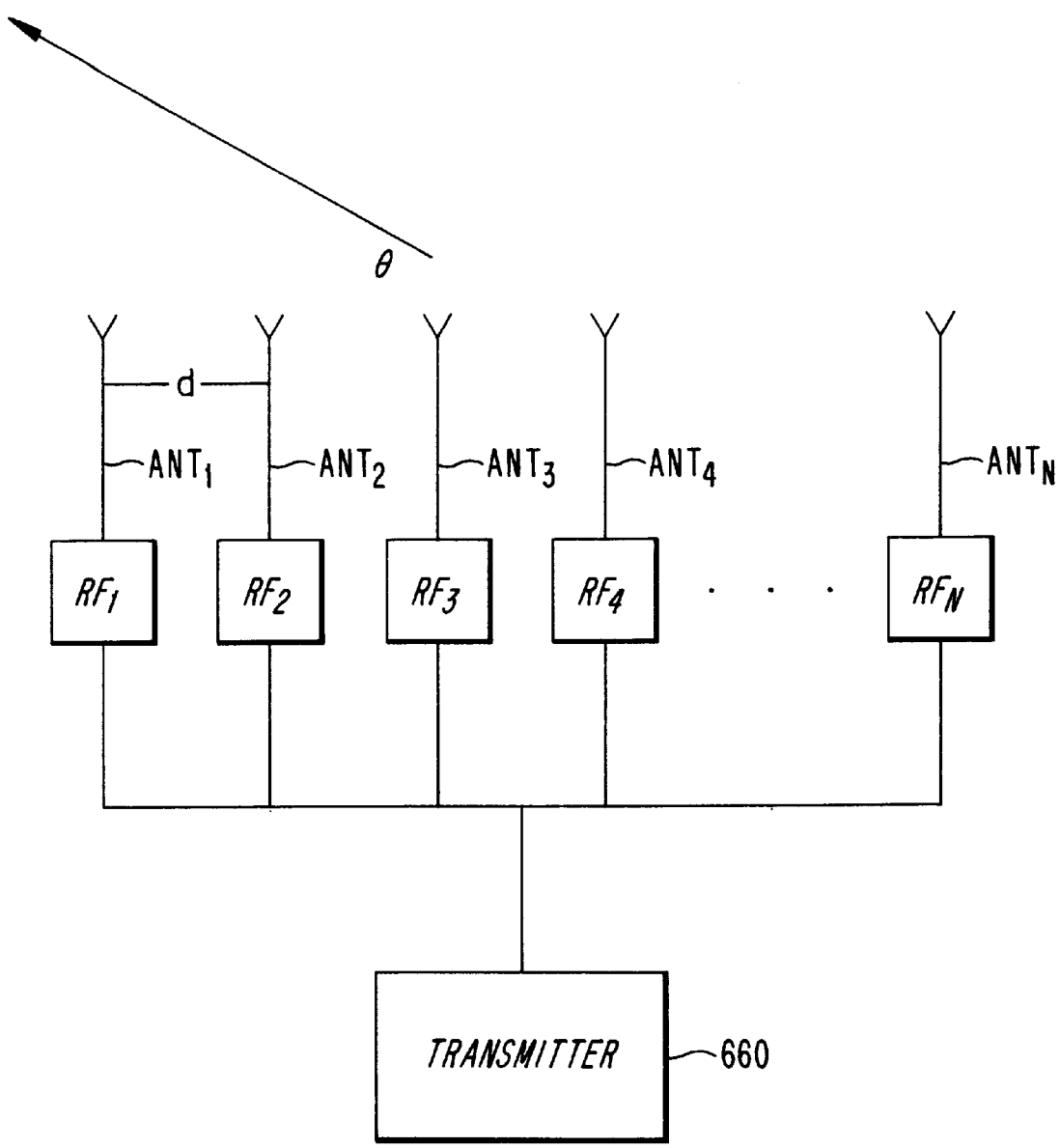
FIG. 7 illustrates beamsteering according to exemplary embodiments of the present invention.

Direction of arrival information is provided to interference rejection beamforming (IRB) transmitter 600 where $\theta_{avg}$ is used to compute a phase offset between the transmitter output signals. The computed phase offset is, in turn, used to steer the resulting downlink radiation pattern from the transmit antennas toward the intended mobile station. Typically, the phase offset used for beam steering in the downlink will differ from the phase offset measured between received signals in the uplink due to differences between the base station's receive and transmit antenna structure. To determine the transmit phase offset used to achieve the desired beam steering angle θ, the system uses the known relationships between the desired angle θ and each transmit antenna's response. These relationships can be predetermined. As an illustrative example, consider a number of ideal, linear transmit antennas $ANT_1-ANT_N$ shown in FIG. 7. Therein, each antenna in the array is separated by a spacing d. Assuming there is no cross-coupling between the antennas, the signal from transmitter 660 to be coupled to each transmit antenna can be phase shifted relative to one another in corresponding blocks $RF_1-RF_N$ using the relative antenna responses as described by the relationship:

$$a_t(\theta) = \begin{pmatrix} 1 \\ e^{j\frac{d}{c}\sin(\theta)} \\ e^{j\frac{2d}{c}\sin(\theta)} \\ \vdots \\ e^{j\frac{Nd}{c}\sin(\theta)} \end{pmatrix}$$

where t is the antenna number.

Of course practical antenna arrays will not necessarily be ideal, linear or lack cross-coupling effects. Accordingly, a more practical approach to determining the relative response of the antennas in an array is to measure responses for a number of beam steering angles θ and store those responses in a look-up table. The look-up table can then be accessed to provide the appropriate phase shift(s) to each transmission path based upon the DOA information received from the IRC receiver.

Accordingly, for the exemplary system described above having two transmit antennas, steering is accomplished by providing the calculated transmit phase offset (and possibly an amplitude imbalance) between the two output signals generated by beamforming transmitter 600. This may be accomplished at radio frequency (RF) as illustrated in FIG. 8 or at baseband as shown in FIG. 9.

Figure 8:
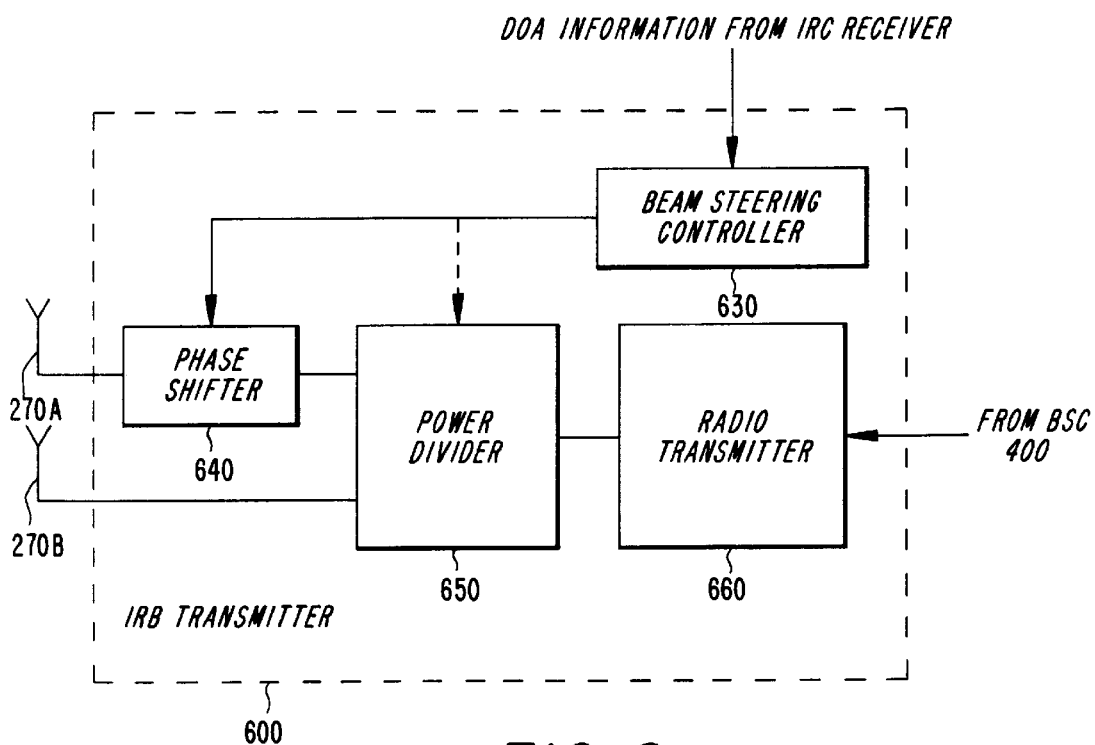
FIG. 8 is a block diagram of an IRB transmitter according to a first exemplary embodiment.

Referring to FIG. 8, DOA information from IRC receiver 500 is coupled to beam steering controller 630 where the phase offset is computed. Downlink signals generated in radio transmitter 660 are divided in power divider 650 into a plurality of outputs. Although for simplicity of description, only two outputs are shown in FIG. 8, it is contemplated by the present invention that there could be more than two outputs. In the simplest embodiment, the two output signals generated by beamforming transmitter 600 are of equal amplitude, but this is not a requirement and better performance may be achieved by varying the relative amplitude and phase between the two (or more) output signals generated by beamforming transmitter 600 although at the cost of increased complexity. Amplitude offsets are provided in power divider 650 which is optionally coupled to beam steering controller 630. Phase offsets are provided by introducing a phase shifter 640 which is controlled by beam steering controller 630. The two (or more) outputs are coupled to antennas 270A' and 270B' and radiated. As a result of the phase (and optional amplitude imbalance) between the two (or more) output signals, the resulting radiation pattern from antennas 270A' and 270B' is directed towards the mobile station from whose uplink signals the DOA information was computed.

Figure 9:
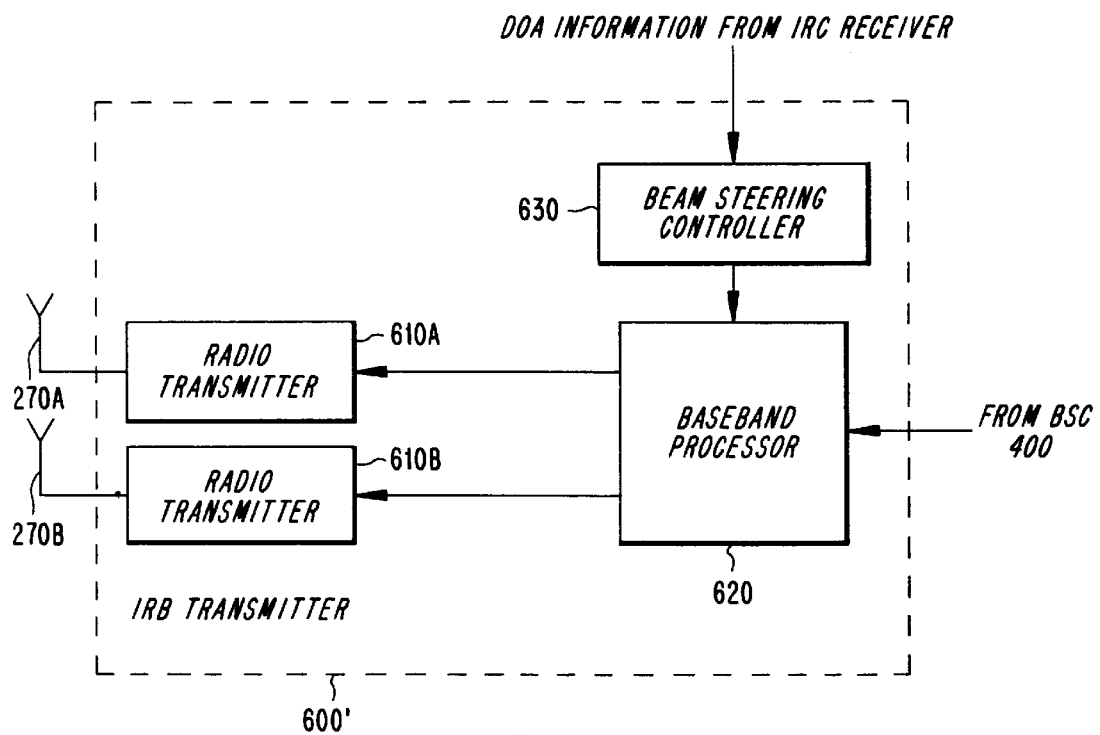
FIG. 9 is a block diagram of an IRB transmitter according to a second exemplary embodiment.

Alternatively, the beamforming can take place at baseband as shown in FIG. 9. DOA information from IRC receiver 500 is coupled to beam steering controller 630 where the DOA information is used to compute the phase (and possibly amplitude) offsets needed to steer the downlink beam in the direction of the mobile station. The phase (and possibly) amplitude information is coupled to baseband processor 620 which generates the baseband signals. As mentioned previously, although only two outputs are shown for clarity, it is fully within the scope of the present invention to have more than two outputs. The outputs from baseband processor 620 are coupled to radio transmitters 660A–B where the baseband signals are modulated and upconverted according to known techniques. The resulting RF downlink signals are coupled after optional amplification and combining (not shown) to antennas 270A' and 270B' and radiated. As a result of the phase (and optional amplitude imbalance) between the two (or more) output signals, the resulting radiation pattern from antennas 270A' and 270B' is directed towards the mobile station from whose uplink signals the DOA information was computed.

The foregoing exemplary embodiments of the present invention have been described in terms of a base station and antenna system having two antennas. It will be recognized by one skilled in the art that the invention can also be practiced in base stations having more than two antennas. For example, different antennas could be used for uplink and downlink. For example, two receive antennas might suffice to give accurate DOA information while more than two transmit antennas can be used in the downlink to further enhance the downlink C/I.

Thus, according to exemplary embodiments of the present invention, both the uplink and downlink signal quality can be improved, for example, on the order of 3 dB C/I. This improvement can be used, for example, to increase frequency re-use in existing systems and thereby increase system capacity. For example, D-AMPS and PDC networks could operate using a 4/12 frequency re-use pattern instead of the 7/21 pattern that is typically used today.

While the present invention has been described with respect to a particular embodiment, those skilled in the art will recognize that the present invention is not limited to the specific embodiments described and illustrated herein. Different embodiments and adaptations besides those shown and described as well as many variations, modifications and equivalent arrangements will now be reasonably suggested by the foregoing specification and drawings without departing from the substance or scope of the invention. While the present invention has been described herein in detail in relation to its preferred embodiments, it is to be understood that this disclosure is only illustrative and exemplary of the present invention and is merely for the purposes of providing a full and enabling disclosure of the invention. Accordingly, it is intended that the invention be limited only by the spirit and scope of the claims appended hereto.

What is claimed is:

1. In a communications system for transmitting information symbols, a base station comprising:
    an antenna array for receiving an uplink radio signal, said antenna array including at least two antennas, wherein each antenna generates a stream of received samples from said radio signal;
    a receiver for combining information provided by said at least two streams of received samples from said at least two antennas to generate detected information symbols, said receiver including:
        an impairment correlation unit which estimates a correlation between impairment associated with one of said at least two antennas and impairment associated with another of said at least two antennas and uses said correlation estimate to combine said at least two streams of received samples;
    wherein said at least two antennas include a first antenna and a second antenna which are spaced apart by less than 10 wavelengths of said radio signal.

2. The base station of claim 1, wherein said at least two antennas include a first antenna and a second antenna which are spaced apart by less than 5 wavelengths of said radio signal.

3. The base station of claim 1, wherein said at least two antennas include a first antenna and a second antenna which are spaced apart by less than 1 wavelength of said radio signal.

4. The base station of claim 1, further comprising:
    a radio transmitter for generating downlink radio signals;
    a power divider for dividing said generated downlink radio signals into at least two output signals, said at least two output signals being coupled to one each of said at least two antennas, and
    a beam steering controller for receiving direction of arrival information from said receiver and using said direction of arrival information to generate at least one phase offset, said at least one phase offset used to adjust at least one phase of at least one of said at least two output signals.

5. The base station of claim 1, further comprising:
    a baseband processor for receiving an information signal to be transmitted and modulating said information signal to generate at least two baseband signals;
    a beam steering controller for receiving direction of arrival information from said receiver and using said direction of arrival information to generate at least one phase offset, said at least one phase offset used by said baseband processor to generate at least one of said at least two baseband signals; and
    a transmitter includes at least two radio transmitters for receiving said at least two baseband signals, processing said at least two baseband signals into at least two radio frequency signals and coupling said radio frequency signals to said at least two antennas.

6. The base station of claim 1, wherein said base station provides radiocommunication coverage for a cell having a radius of 3–5 kilometers.

7. A base station which provides radiocommunication coverage for a geographic area, comprising:
    an antenna array for receiving an uplink radio signal, said antenna array including at least two antennas, wherein each antenna generates a stream of received samples from said radio signal and wherein a spacing separates each antenna; and
    a receiver for combining information provided by said at least two streams of received samples from said at least two antennas to generate detected information symbols;
    wherein said receiver comprises:
        a channel tap estimator for estimating channel taps for each of said antennas to produce channel tap estimates;
        an impairment correlation estimator for estimating impairment correlation properties among the antennas to produce an estimate of impairment correlation properties;
        a branch metric processor for forming branch metrics using said received samples, said channel tap estimates, and said estimate ot impairment correlation properties, and
        a sequence estimation processor employing said branch metrics to estimate a transmitted symbol sequence.

8. The base station of claim 7, wherein said spacing is less than 5 wavelengths of said radio signal.

9. The base station of claim 7, wherein said spacing is less than 1 wavelength of said radio signal.

10. The base station of claim 7, further comprising:
a radio transmitter for generating downlink radio signals;
a power divider for dividing said generated downlink radio signals into at least two output signals, said at least two output signals being coupled to one each of said at least two antennas, and
a beam steering controller for receiving direction of arrival information from said receiver and using said direction of arrival information to generate at least one phase offset, said at least one phase offset used to adjust a phase of at least one of said at least two output signals.

11. The base station of claim 7, further comprising:
a baseband processor for receiving an information signal to be transmitted and modulating said information signal to generate at least two baseband signals;
a beam steering controller for receiving direction of arrival information from said receiver and using said direction of arrival information to generate at least one phase offset, said at least one phase offset used by said baseband processor to generate at least one of said at least two baseband signals; and
at least two radio transmitters for receiving said at least two baseband signals, processing said at least two baseband signals into at least two radio frequency signals and coupling said radio frequency signals to said at least two antennas.

12. A base station comprising:
an antenna array for receiving an uplink radio signal, said antenna array including at least two antennas, wherein each antenna generates a stream of received samples from said radio signal;
a receiver for combining information provided by said at least two streams of received samples from said at least two antennas to generate a detected symbol stream, said receiver including:
    an impairment correlation unit which estimates a correlation between impairment associated with one of said at least two antennas and impairment associated with another of said at least two antennas and uses said estimate to combine said at least two sample streams;
a baseband processor for receiving an information signal to be transmitted and modulating said information signal to generate at least two baseband signals;
a beam steering controller for receiving direction of arrival information from said receiver and using said direction of arrival information to generate at least one phase offset, said at least one phase offset used by said baseband processor to generate at least one of said at least two baseband signals; and
at least two radio transmitters for receiving said at least two baseband signals, processing said at least two baseband signals into at least two radio frequency signals and coupling said radio frequency signals to said at least two antennas.

13. A base station comprising:
an antenna array for receiving an uplink radio signal, said antenna array including at least two antennas, wherein each antenna generates a stream of received samples from said radio signal;
a receiver for combining information provided by said at least two streams of receiving samples from said at least two antennas to generate a detected symbol stream, said receiver including:
    an impairment correlation unit which estimates a correlation between impairment associated with one of said at least two antennas and impairment associated with another of said at least two antennas and uses said estimate to combine said at least two sample streams;
a radio transmitter for generating downlink radio signals;
a power divider for dividing said generated downlink radio signals into at least two output signals, said at least two output signals being coupled to one each of said at least two antennas; and
a beam steering controller for receiving direction of arrival information from said receiver and using said direction of arrival information to generate at least one phase offset, said at least one phase offset used to adjust a phase of one of said at least two output signals.

14. A method for communicating between a base station and a mobile station comprising the steps of:
receiving, at base station, an uplink radio signal from said mobile station on at least two antennas;
processing signals from said at least two antennas using estimates of antenna impairment correlation to output detected symbols;
determining a direction of arrival of said uplink radio signal using information obtained from said processing step; and
transmitting, from said base station, a downlink radio signal using said direction of arrival information to steer said downlink radio signal toward said mobile station.

15. A method for reducing the effects of signal fading, time dispersion, and interference in a base station, comprising the steps of:
receiving, using an antenna array having at least two separate antennas, a transmitted signal sequence;
processing said transmitted signal sequence to produce signal samples for each of said antennas;
estimating channel taps for each of said antennas to produce channel tap estimates;
estimating impairment correlation properties among the antennas to produce an estimate of impairment correlation properties;
forming branch metrics in a branch metric processor using the signal samples, said channel tap estimates, and said estimate of impairment correlation properties; and
employing said branch metrics in a sequence estimation algorithm to estimate said transmitted symbol sequence.

16. In a communications system for transmitting information symbols, a receiving station comprising:
an antenna array for receiving an uplink radio signal, said antenna array including at least two antennas, wherein each antenna generates a stream of received samples from said radio signal; and
a receiver for combining information provided by said at least two streams of received samples from said at least two antennas to generate detected information symbols, said receiver including:
    an impairment correlation unit which estimates a correlation between impairment associated with one of said at least two antennas and impairment associated with another of said at least two antennas and uses said correlation estimate to combine said at least two streams of received samples.

* * * * *